(12) United States Patent
Nakano

(10) Patent No.: US 8,432,886 B2
(45) Date of Patent: Apr. 30, 2013

(54) COMMUNICATION NODE, COMMUNICATION SYSTEM AND AD HOC COMMUNICATION METHOD IN ACCORDANCE WITH TIME DIVISION MULTIPLE ACCESS SCHEME

(75) Inventor: Hiroyuki Nakano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 195 days.

(21) Appl. No.: 12/823,822

(22) Filed: Jun. 25, 2010

(65) Prior Publication Data

US 2010/0260166 A1 Oct. 14, 2010

Related U.S. Application Data

(63) Continuation of application No. PCT/JP2007/075300, filed on Dec. 28, 2007.

(51) Int. Cl.
*H04B 7/212* (2006.01)

(52) U.S. Cl.
USPC ............ 370/347; 370/330; 370/338; 370/458

(58) Field of Classification Search ........................ None
See application file for complete search history.

(56) References Cited

U.S. PATENT DOCUMENTS

| | | | |
|---|---|---|---|
| 7,027,409 B2 * | 4/2006 | Cain | 370/252 |
| 7,333,458 B2 * | 2/2008 | Cain | 370/337 |
| 7,948,939 B2 * | 5/2011 | Sugaya et al. | 370/329 |
| 2005/0074025 A1 * | 4/2005 | Shao et al. | 370/461 |
| 2005/0259617 A1 | 11/2005 | Wason et al. | |
| 2006/0198353 A1 | 9/2006 | Wason et al. | |

FOREIGN PATENT DOCUMENTS

| | | |
|---|---|---|
| JP | 11069441 | 3/1999 |
| JP | 2000165314 | 6/2000 |
| JP | 2004186935 A | 7/2004 |
| JP | 2005323375 | 11/2005 |
| JP | 2006182207 | 7/2006 |
| WO | 2007061014 A1 | 5/2007 |

OTHER PUBLICATIONS

International Preliminary Report on Patentability and Written Opinion of the International Searching Authority in PCT/JP2007/075300 dated Aug. 19, 2010.
International Search Report dated Feb. 5, 2008 in corresponding International application No. PCT/JP2007/075300.

(Continued)

*Primary Examiner* — Bob Phunkulh
(74) *Attorney, Agent, or Firm* — Smith, Gambrell & Russell, LLP

(57) ABSTRACT

A communication node, which performs ad hoc communication by occupying at least one time slot and transmitting a data block to one or a plurality of other nodes via the occupied at least one time slot through broadcasting, comprises a determination unit that determines an occupation time slot to be occupied by an own node in a frame used for transmitting the data block, based on occupation state data, a data block generating unit that generates the data block storing, in a control field, control data containing new occupation state data obtained by updating the occupation state data based on an occupation state of the occupation time slot, the data block being to be transmitted by the own node through the broadcasting, and a transmission unit that transmits the data block generated through the broadcasting via the occupation time slot.

9 Claims, 12 Drawing Sheets

OTHER PUBLICATIONS

Japanese Notice of Reason for Rejection dated Jul. 10, 2012 issued in application No. 2009-547848.
S. Makido, et al., Decentralized TDMA Protocol for Real-time Vehicle-to-Vehicle Communications, Information Processing Society of Japan, V48(7), Jul. 2007, pp. 2257-2265 Partial Translation, p. 2258, Right Column, p. 2259 and p. 2260 (Left Column).
Tomohisa Harada, et al., Inter-Vehicle Communication System with Decentralized TDMA Protocol for Safety Driving, vol. 2007, No. 116, IPSJ SIG Technical Reports, Japan, Information Processing Society of Japan, p. 129 to 136 dated Nov. 22, 2007.
Japanese Office Action mailed Nov. 6, 2012 issued in corresponding Japanese Patent Application No. 2009-547848.

* cited by examiner

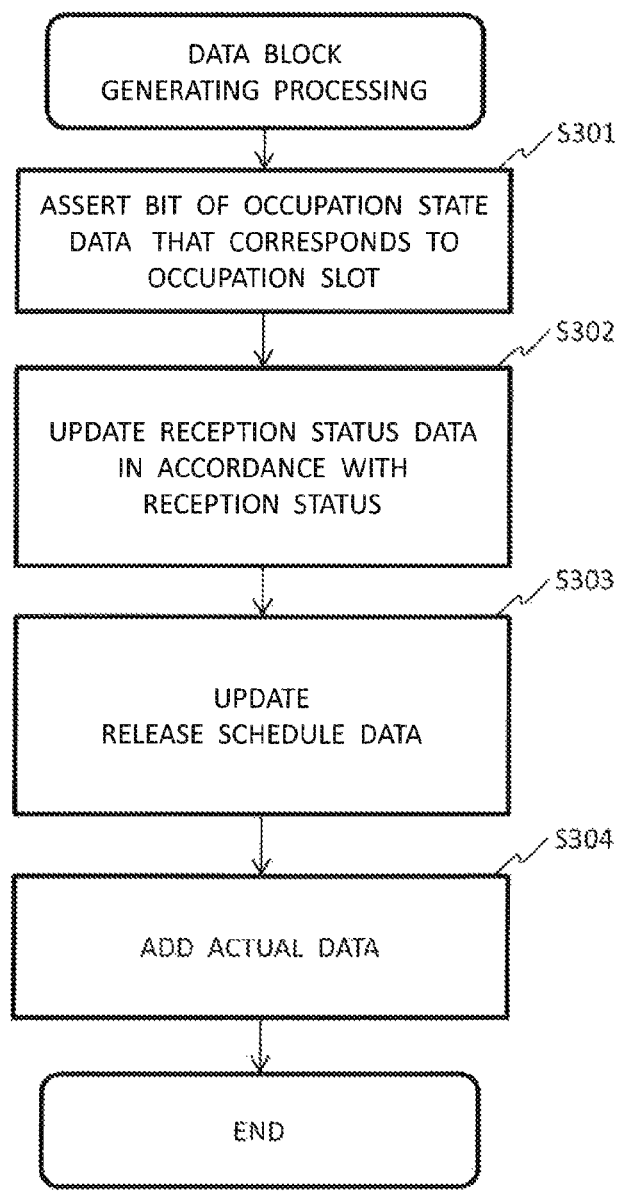

COMMUNICATION NODE, COMMUNICATION SYSTEM AND AD HOC COMMUNICATION METHOD IN ACCORDANCE WITH TIME DIVISION MULTIPLE ACCESS SCHEME

CROSS-REFERENCE TO RELATED APPLICATION

This is a continuation of Application PCT/JP2007/075300, filed on Dec. 28, 2007, now pending, the entire contents of which are incorporated herein by reference.

FIELD

The present invention relates to an ad hoc communication technology implemented in accordance with a time division multiple access scheme, in which at least one time slot in one frame formed of a plurality of time slots is occupied, and a data block is transmitted to one or a plurality of other nodes via the occupied at least one time slot through broadcasting.

BACKGROUND

In order to realize services aimed at improvements in safety, transport efficiency, comfort, etc., the development of an intelligent transport system (ITS) in which roads and vehicles are integrated together as a whole system has been promoted. The ITS is intended to realize such services by means of road-to-vehicle communication that is performed between a base station installed on a road and a mobile station mounted onto a vehicle or vehicle-to-vehicle communication that is performed between mobile stations.

Here, if an attempt is made to use the same communication scheme between the road-to-vehicle communication and the vehicle-to-vehicle communication for the purpose of effective use of limited frequency resources or the like, there is a risk that the communication schemes used in the two communications affect each other. In view of the above, there is disclosed a technology that enables avoiding interference from the vehicle-to-vehicle communication in a road-to-vehicle communication area by allocating a slot of a communication frame used for the road-to-vehicle communication, which is allocated to a predetermined mobile station, for communication with another mobile station that desires to perform the vehicle-to-vehicle communication with the predetermined mobile station (for example, see Patent Document 1).

Further, there is disclosed a technology of simultaneously transmitting, in polling performed between mobile stations and a base station, a polling instruction signal used for the polling and a predetermined collision control signal for avoiding a collision of polling actions in order to avoid the collision of the polling actions intended for the mobile stations and, at the same time, to minimize a time period required for the polling (for example, see Patent Document 2).

Patent Document 1: Japanese Laid-open Patent Publication No. 2000-165314
Patent Document 2: Japanese Laid-open Patent Publication No. 11-69441
Patent Document 3: Japanese Laid-open Patent Publication No. 2006-182207

In the above-mentioned road-to-vehicle communication and vehicle-to-vehicle communication, the communication schemes are conventionally separated from each other. Due to this, the use of frequency resources is not necessarily efficient. Meanwhile, if both the communication schemes are to be implemented in the same frequency band, it may be necessary to secure the frequency resources so as to prevent a collision of the communication actions. Considering this fact from a broader point of view, efficient utilization of frequency resources and avoidance of a collision are a significantly important challenge for communication performed among communication nodes, such as a plurality of mobile stations.

SUMMARY

One of aspects of the present invention is a communication node that performs ad hoc communication in accordance with a time division multiple access scheme by occupying at least one time slot in one frame formed of a plurality of time slots and transmitting a data block to one or a plurality of other nodes via the occupied at least one time slot through broadcasting, the communication node including: a determination unit that determines, from among the plurality of time slots, an occupation time slot to be occupied by an own node in a transmission target frame used for transmitting the data block, based on occupation state data indicating an occupied/unoccupied state of each of the plurality of time slots, which the own node possesses at a time point before the transmission target frame; a data block generating unit that generates the data block storing, in a control field, control data containing new occupation state data obtained by updating the occupation state data based on an occupation state of the occupation time slot determined by the determination unit, the data block being to be transmitted by the own node through the broadcasting; and a transmission unit that transmits the data block generated by the data block generating unit through the broadcasting via the occupation time slot determined by the determination unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 8 is a flow chart of data block generating processing that is executed in the communication node according to the embodiment of the present invention.

DESCRIPTION OF EMBODIMENTS

Here, with reference to the accompanying drawings, description is given of an embodiment mode of the above-mentioned communication node that performs the ad hoc communication in accordance with the time division multiple access scheme, the communication method, and the communication system formed by the communication nodes.

It should be noted that the configuration of the embodiments described below is provided by way of example so that the disclosure satisfies the requirements under Patent Law, and the scope of right of the present invention is not limited to the configuration of the following embodiments.

Figure 1:
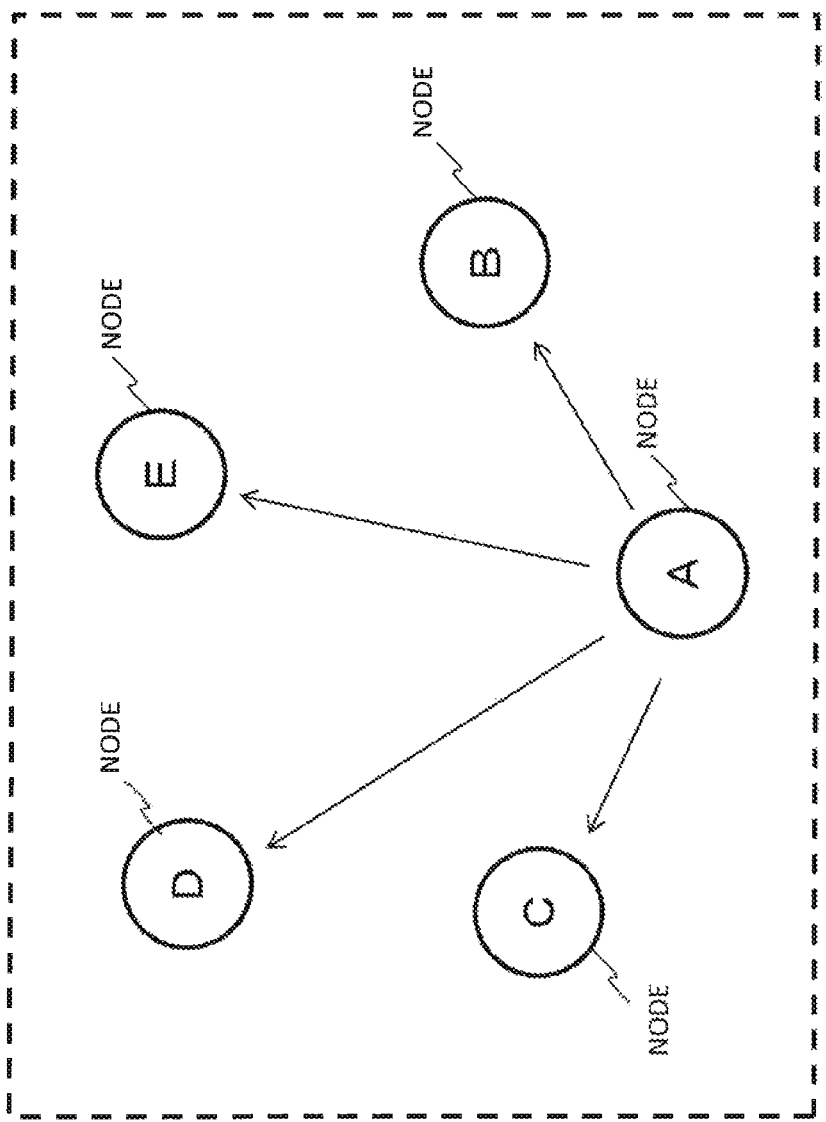
FIG. 1 is a diagram illustrating a schematic configuration of a communication system according to an embodiment of the present invention.

FIG. 1 illustrates a schematic configuration of a communication system configured by a plurality of communication nodes (hereinafter, simply referred to as "nodes") (in this embodiment, five nodes A to E) according to the embodiment of the present invention.

In this embodiment, the nodes share a common communication technology relevant to the present invention, and accordingly, in the following embodiment, there is a case in which detailed description is only given of one node.

The node is a communication node that performs the ad hoc communication in accordance with the time division multiple access (TDMA) scheme. Such a communication technology itself is known conventionally, and hence detailed description thereof is omitted. Further, the nodes may be mobile nodes that change their positions freely on an autonomous basis or in accordance with an instruction from outside. Alternatively, the nodes may be stationary nodes that do not change their positions. Examples of such nodes include an automobile mounted with a communication device and a base station that is installed on a road for an automobile to travel along and is capable of communication with the automobile. Accordingly, the state illustrated in FIG. 1 may be regarded as representing a communication state among moving or parked automobiles, that is, a state of performing vehicle-to-vehicle communication, or may be regarded as representing a state in which, in addition to the vehicle-to-vehicle communication, road-to-vehicle communication performed between the automobile and the base station exists in a mixed manner. Thus, even when the vehicle-to-vehicle communication and the road-to-vehicle communication exist in a mixed manner, the nodes may avoid a collision at the time of broadcasting a communication frame. Hereinafter, detailed description is given of the nodes and the communication system configured thereby.

Figure 2:
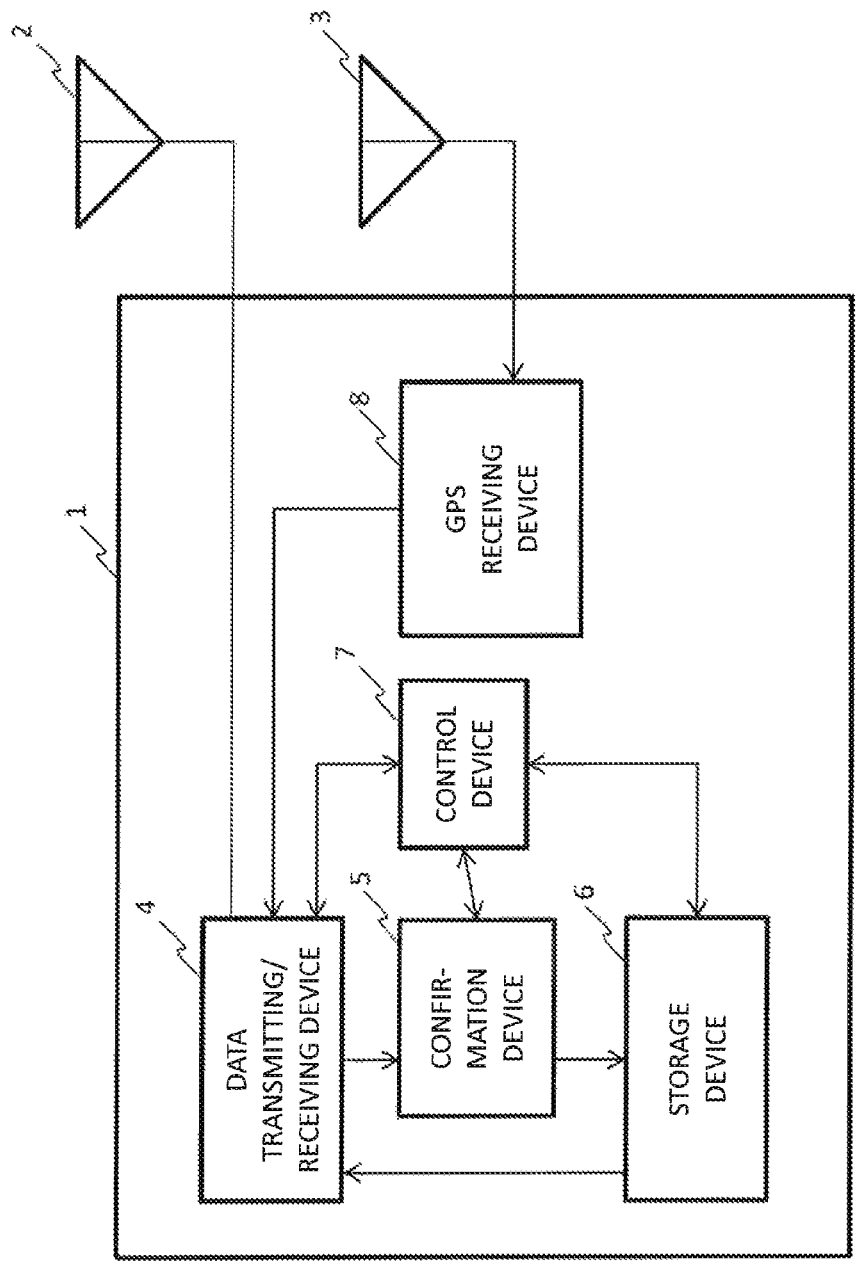
FIG. 2 is a diagram illustrating a schematic configuration of a communication node included in the communication system illustrated in FIG. 1.

Here, FIG. 2 illustrates a schematic configuration of a node 1, which corresponds to each of the above-mentioned nodes A to E. Further, in a relation between one node and the other nodes, when the one node refers to a self-node thereof, the self-node is referred to as "own node". When the one node refers to the other nodes, the other nodes are referred to as "another node". Here, the node 1 includes a transmitting/receiving antenna 2 for performing communication with another node, and a receiving antenna 3 that receives a global positioning system (GPS) signal transmitted from an artificial satellite or the like.

Further, the node 1 includes a data transmitting/receiving device 4 that processes data to be transmitted/received via the transmitting/receiving antenna 2 in order to perform the ad hoc communication in accordance with the TDMA scheme. Further, the GPS signal received by the receiving antenna 3 is first passed to a GPS receiving device 8, and then is transferred to the data transmitting/receiving device 4. The data transmitting/receiving device 4 to which the GPS signal has been transferred synchronizes transmission frames for the above-mentioned communication based on the GPS signal. Further, there is provided a storage device 6 that stores data to be transmitted by the data transmitting/receiving device 4 and data received by the data transmitting/receiving device 4. It should be noted that there is provided a confirmation device 5 that confirms, before data received by the data transmitting/receiving device 4 is stored in the storage device 6, whether or not that data is appropriate communication data. Further, there is provided a control device 7 that controls various devices (not shown) as well as the data transmitting/receiving device 4, the confirmation device 5, and the storage device 6. Under the control of the control device 7, the node 1 implements various functions including the above-mentioned communication.

Figure 3:
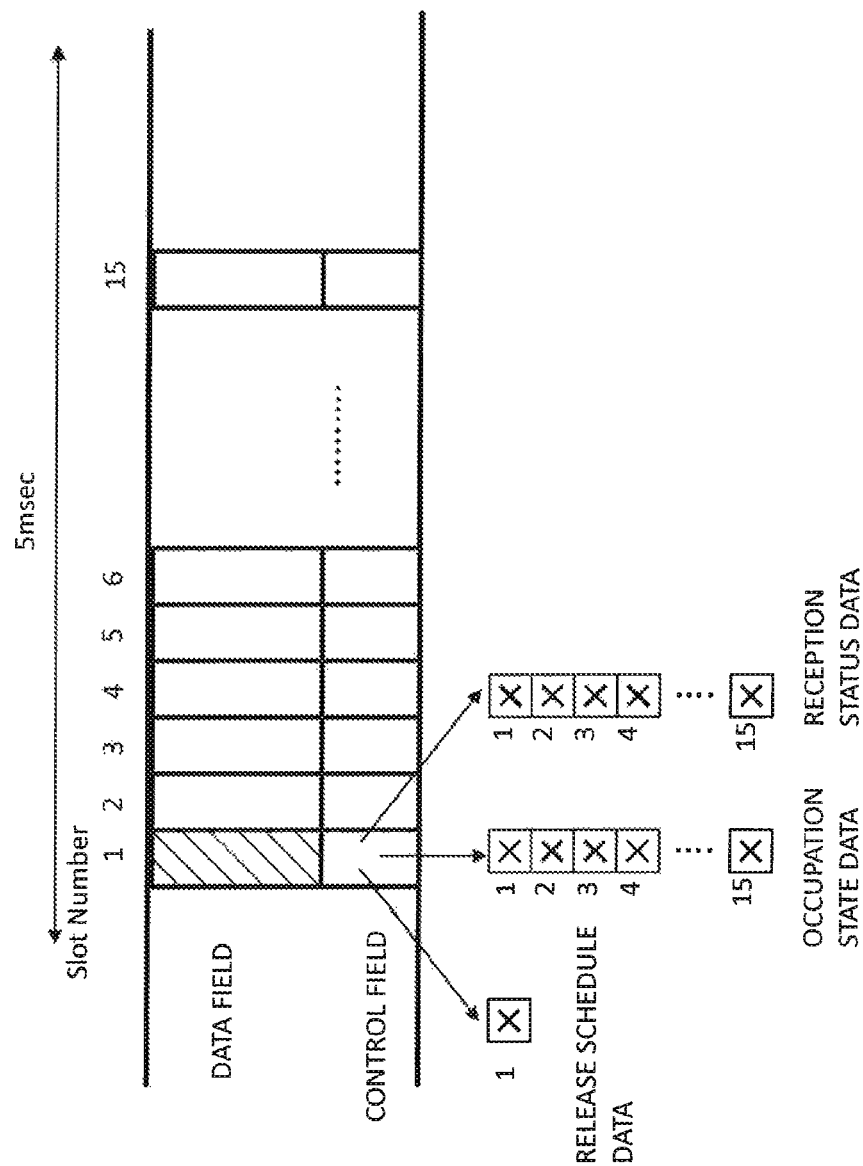
FIG. 3 is a diagram illustrating structure of a transmission frame formed in the communication node according to the embodiment of the present invention.

Here, with reference to FIG. 3, description is given of structure of a frame used for the TDMA scheme according to the embodiment of the present invention, which is formed by the data transmitting/receiving device 4 under the control of the control device 7. In accordance with the conventional requirements for the advanced safety vehicle (ASV) in the vehicle-to-vehicle communication, the node 1 according to this embodiment mutually performs transmission of a frame with another node through broadcasting every 100 msec. Then, the maximum capacity of one frame is set to 200 bytes, and 15 time slots (hereinafter, simply referred to as "slots") are provided to one frame. It should be noted that one frame duration is 5 msec. More specifically, as illustrated in FIG. 3, slots having slot numbers 1 to 15 are formed serially in terms of time, to thereby form one frame (5 msec).

Then, each of the slots is segmented into a data field and a control field. The data field is a field for storing substantive data that the node 1 desires to transmit to another node through the above-mentioned communication (hereinafter, referred to as "actual data"). On the other hand, the control field is a field for storing control data used for the node 1 to implement a function as the communication node according to the embodiment of the present invention. The whole of data pieces stored in the data field and the control field is hereinafter referred to as a data block. Based on the control data stored in the control field, the node 1 performs the ad hoc communication between nodes, thereby enabling efficient utilization of frequency resources and avoidance of a collision.

Here, as illustrated in FIG. 3, the control data contains at least three types of data, which are occupation state data, reception status data, and release schedule data. The occupation state data is data regarding occupation states of slots to be occupied, for communication in accordance with the TDMA scheme, by the nodes performing that communication, and deals with all slots as far as the node can recognize. To give more specific description with reference to FIG. 3, the occupation state data is data regarding the occupation states set for the respective slots having the slot numbers 1 to 15, which are recognized by a node performing the above-mentioned communication by occupying a predetermined slot (in FIG. 3, slot 1). In this embodiment, the occupation state is indicated by a symbol of "∘" or "x". The mark "∘" (circle) means that a bit is asserted and that the corresponding slot is in an occupied state. On the other hand, the mark "x" (cross) means that the bit is negated and that the corresponding slot is in an unoccupied state. Then, the control field of a slot stores the occupation state data recognized by a node performing the above-mentioned communication by occupying the corresponding slot.

Further, the reception status data is data indicating whether or not reception of data has been performed normally when the above-mentioned communication is performed between nodes. Similarly to the occupation state data, the reception status data is data regarding the reception statuses set for the respective slots having the slot numbers 1 to 15, which are recognized by a node performing the above-mentioned communication by occupying a predetermined slot (in FIG. 3, slot 1). In this embodiment, the reception status is indicated by the symbol of "∘" or "x". The mark "∘" (circle) means that a bit is asserted and that data of the corresponding slot has been received normally. On the other hand, the mark "x" (cross) means that the bit is negated and that data of the corresponding slot has not been received normally. Then, the control field of a slot stores the reception status data recognized by a node performing the above-mentioned communication by occupying the corresponding slot.

Next, the release schedule data is data indicating whether a node performing the above-mentioned communication by occupying a predetermined slot (in FIG. 3, slot 1) is to continue occupying that slot in the next cycle or release that slot to stop the communication. In this embodiment, the release schedule for a slot that is set by the node is indicated by the symbol of "∘" or "x". The mark "∘" (circle) means that a bit is asserted and that the node is to continue occupying the slot occupied by the node. On the other hand, the mark "x" (cross) means that the bit is negated and that the node is to release the slot occupied by the node. It should be noted that, in the release schedule data, only data for the slot occupied by the node is stored.

Figure 4:
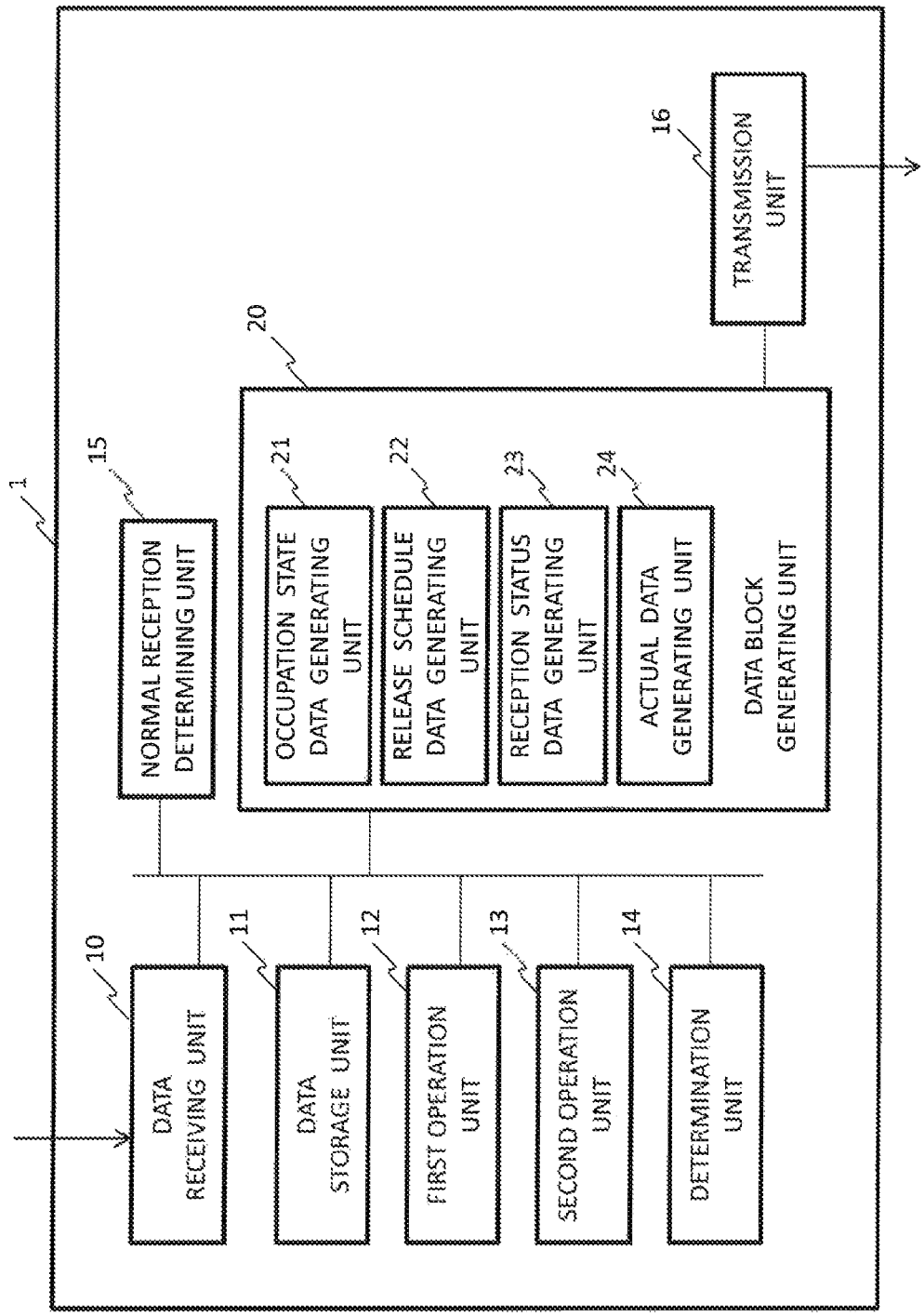
FIG. 4 is a block diagram of the communication node, which is obtained based on functions implemented in the communication node included in the communication system illustrated in FIG. 1.

By using the frame structured as described above, the node performs the ad hoc communication in accordance with the TDMA scheme. In this communication, a transmission side node transmits, along with the actual data, the above-mentioned control data that has been subjected to predetermined processing by the transmission side node. Then, a reception side node receives the transmitted actual data and control data, and also, the control data is subjected to predetermined processing by the reception side node. With this configuration, the efficient utilization of frequency resources and the avoidance of a collision may be achieved. Incidentally, this series of processings performed by the node is executed by the data transmitting/receiving device 4, the storage device 6, and the like under the control of the control device 7. Thus, in FIG. 4, the respective functions implemented within the node 1 through the series of processings are visualized as functional units. Those functions of the functional units are implemented mainly by a predetermined control program being executed within the control device 7. Hereinafter, correlation among the functional units is mainly described.

First, a data receiving unit 10 receives data transmitted from another node, that is, the actual data and the control data. Then, a data storage unit 11 stores, as needed, a part or the whole of the reception data received by the data receiving unit 10. Then, a first operation unit 12 and a second operation unit 13 perform predetermined operational processings with respect to the reception data stored in the data storage unit 11, respectively, and, based on results of the operations, a determination unit 14 determines a slot to be occupied by the node 1 for the above-mentioned communication. Details of the operational processing and the like of each operation unit are described later.

Further, a data block generating unit 20 generates transmission data to be transmitted via the slot determined by the determination unit 14, and includes an occupation state data generating unit 21 that generates the occupation state data to be contained in the transmission data, a release schedule data generating unit 22 that generates the release schedule data, a reception status data generating unit 23 that generates the reception status data, and an actual data generating unit 24 that generates the actual data. Details of the generation of the respective data pieces are described later.

Then, with the use of a transmission unit 16, via the slot determined by the determination unit 14, a data block generated by the data block generating unit 20 is subjected to the ad hoc communication from the node 1 to another node. Described above are the functional blocks implemented through the series of processings of data transmission and reception performed by the node 1. In addition, processing of a normal reception determining unit 15 is also performed. Based on the data received by the data receiving unit 10, particularly, based on the control data, the normal reception determining unit 15 determines whether or not data previously transmitted from the node 1 to another node has been received by the another node normally. Details of the determination processing are described later.

Figure 5:
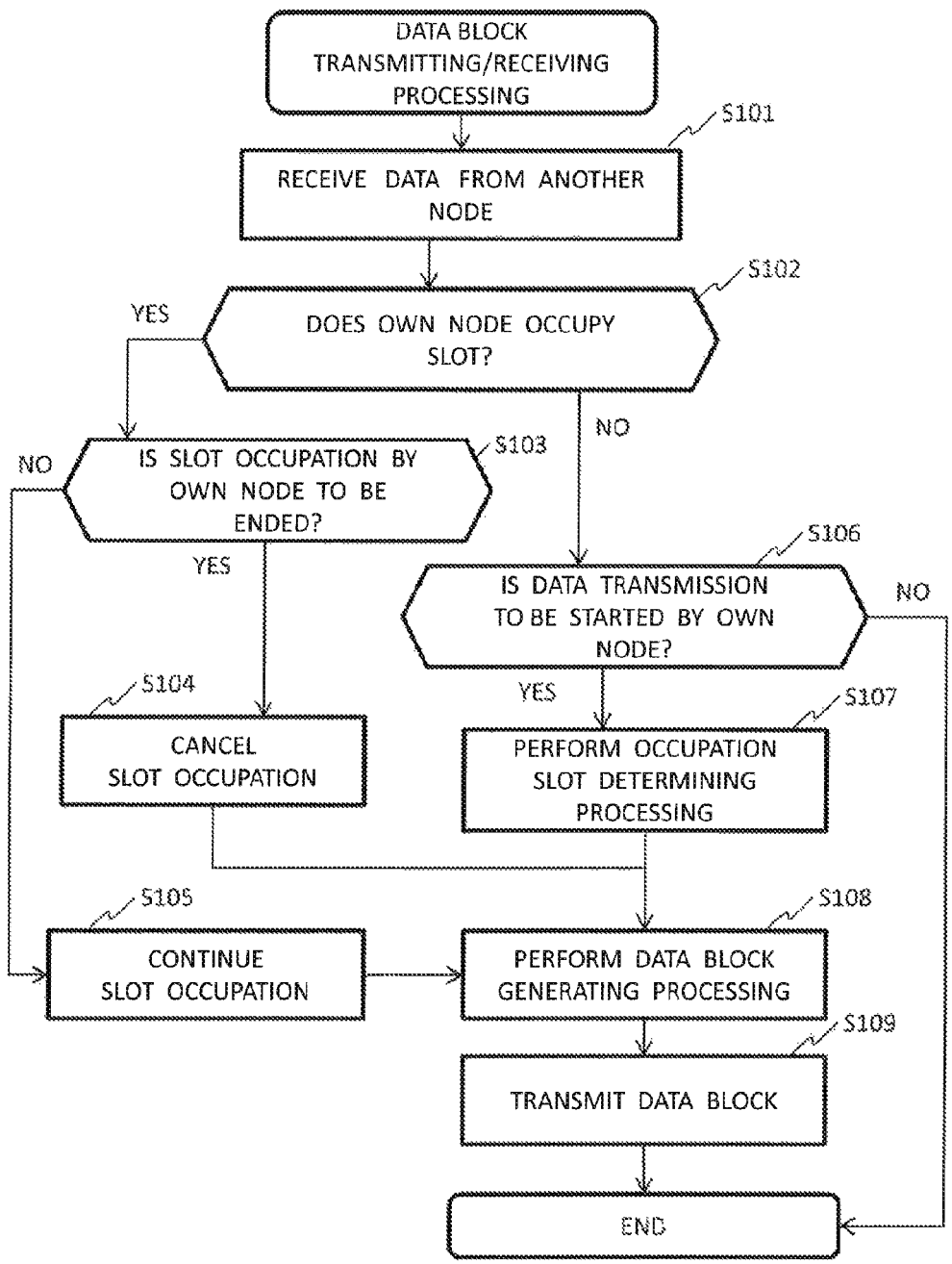
FIG. 5 is a flow chart of data block transmitting/receiving processing that is executed in the communication node according to the embodiment of the present invention.

Next, with reference to FIG. 5 etc., description is given of processing for the ad hoc communication in accordance with the TDMA scheme, which is performed by the node 1 including the above-mentioned functional units. First, in S101, the data receiving unit 10 receives the data block transmitted from another node. At the time of this reception, with respect to the received data block, the data receiving unit 10 performs processing of changing the reception status data according to the reception status thereof. Specifically, when the data block is received normally by the data receiving unit 10, for example, when a cyclic redundancy check (CRC) normality is confirmed, the bit of the reception status data that corresponds to the slot used for the communication is asserted. On the other hand, when the data block is received abnormally, for example, when the CRC abnormality is confirmed, the bit of the reception status data that corresponds to the slot used for the communication is negated. Further, the data storage unit 11 causes the storage device 6 to store the data blocks corresponding to the respective slots of one received frame. Next, in S102, it is determined whether or not the own node (node 1) already occupies one slot for the ad hoc communication. At this time, when the determination is "Yes", the processing proceeds to S103. When the determination is "No", the processing proceeds to S106.

In S103, it is determined whether or not the occupied state of the slot occupied by the own node is to be ended to release that slot. In other words, it is determined whether or not the own node is to leave the communication system illustrated in FIG. 1, which is configured by the own node along with the other nodes, to stop the communication. Here, when the determination is "Yes", the processing proceeds to S104. When the determination is "No", the processing proceeds to S105. In S104, processing for canceling the occupied state of the occupied slot is performed. On the other hand, in S105, the occupied state of the occupied slot is continued. After the processing of S104 or S105, the processing proceeds to S108.

Here, when the determination is "No" in S102 and the processing proceeds to S106, it is determined in S106 whether or not the own node starts to transmit a data block, that is, whether or not it is necessary to determine a slot to be occupied by the own node so as to transmit the data block. Here, when it is determined that the transmission of the data block is to be started, the processing proceeds to S107. When it is determined that the transmission is not to be started, this processing is ended.

In S107, a slot to be occupied by the own node for newly transmitting the data block is determined. In this determination, a slot occupied by another node needs to be avoided so as to prevent a collision. Here, the occupation slot determining processing performed in S107 is described later in detail with reference to FIG. 6. It should be noted that the processing of S107 is executed by the first operation unit 12, the second operation unit 13, and the determination unit 14. After the processing of S107 is ended, the processing proceeds to S108.

In S108, data block generating processing is performed so as to generate the data block to be transmitted from the own node by means of the transmission unit 16 via the slot to be occupied, which is determined in S107. Details of the data block generating processing are described later with reference to FIG. 8. It should be noted that the processing of S108 is executed by the data block generating unit 20 including the data generating units 21 to 24. When the processing of S108 is ended, the transmission unit 16 causes the generated data block to be transmitted to the other nodes through broadcasting in S109.

Figure 6:
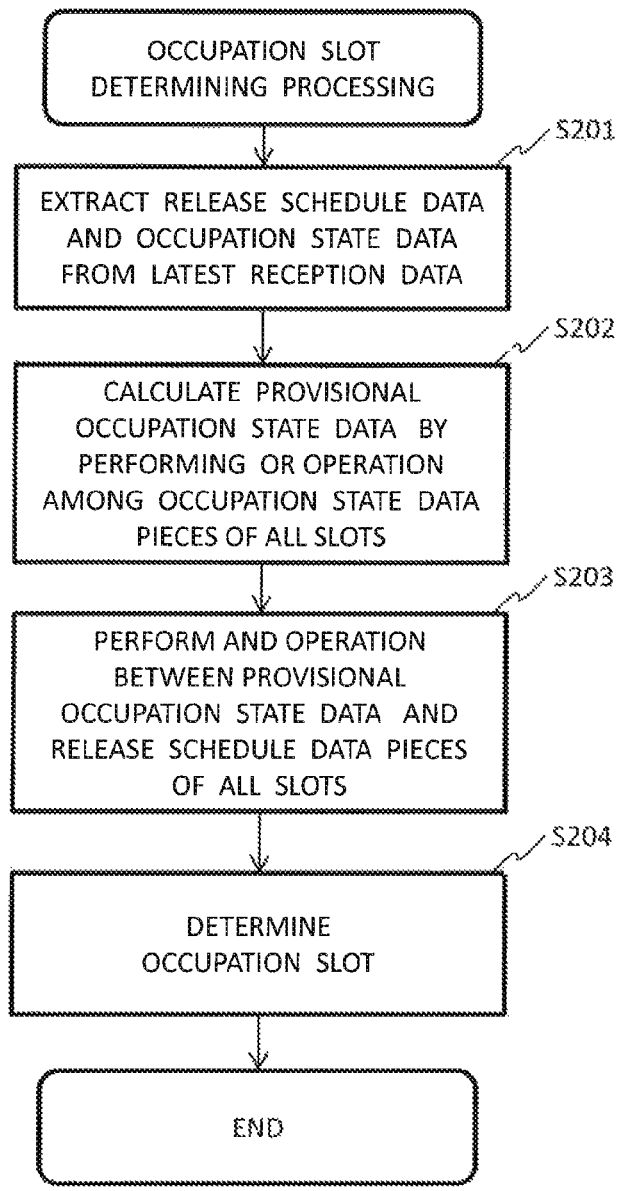
FIG. 6 is a flow chart of occupation slot determining processing that is executed in the communication node according to the embodiment of the present invention.
Figure 7:
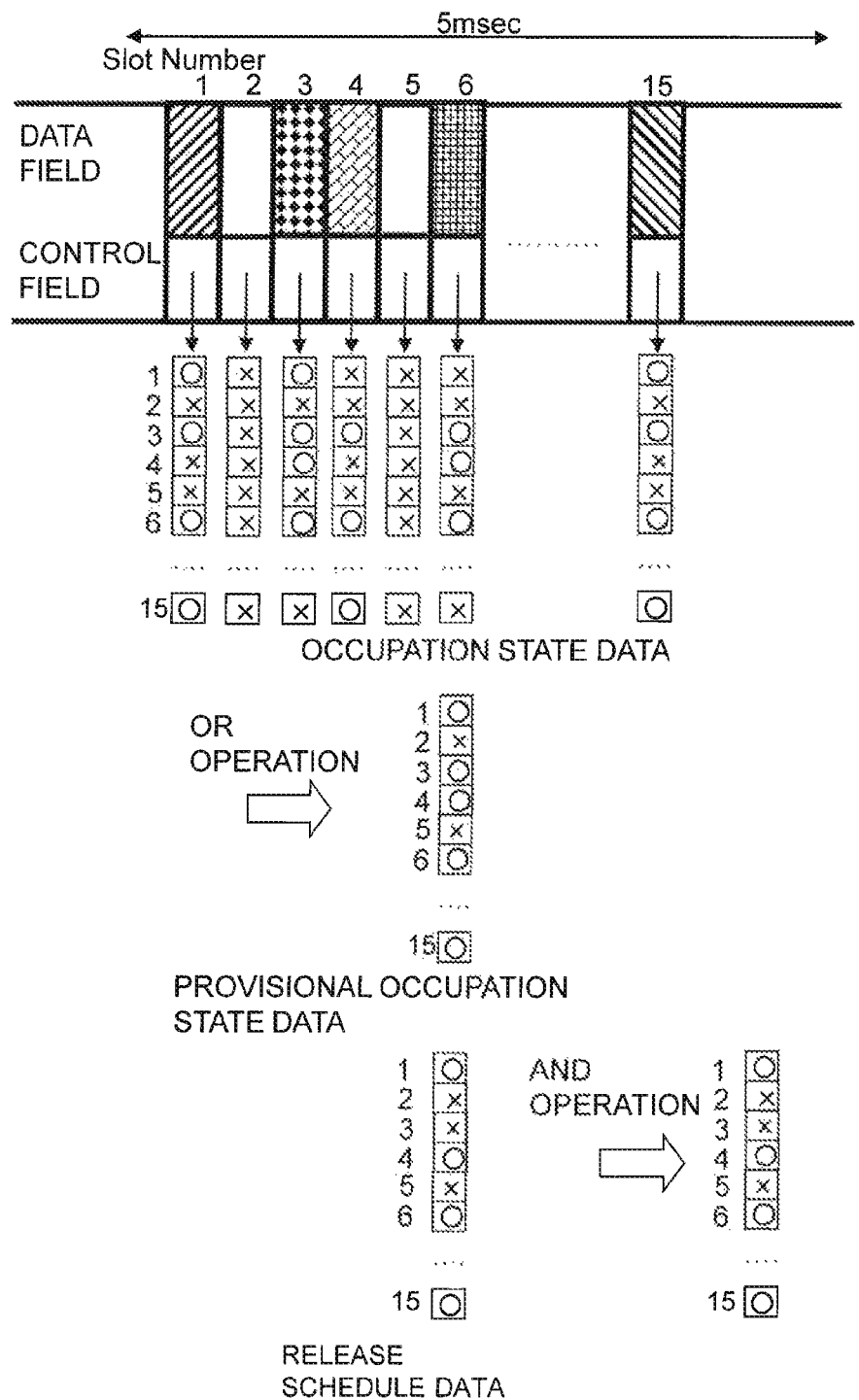
FIG. 7 is a diagram illustrating procedures of processing control data which are taken in the occupation slot determining processing illustrated in FIG. 6.

Here, with reference to FIG. 6 and FIG. 7, description is given of the occupation slot determining processing that is executed in S107 described above. FIG. 6 is a flow chart of the occupation slot determining processing, and FIG. 7 is a diagram illustrating procedures of processing the control data in the transmission frame at the time of performing the occupation slot determining processing.

In S201, from the data blocks corresponding to the respective slots that are stored in the storage device 6 through the processing of S101, in other words, from the data blocks for one frame which the own node receives from the other nodes immediately before performing the processing for an occupation slot, the occupation state data and the release schedule data are extracted from each slot. In the upper part of FIG. 7, the occupation state data stored in the control field of each slot is extracted. In the case illustrated in FIG. 7, a slot 2 and a slot 5 are not occupied (in FIG. 7, occupied slots have data fields thereof displayed with hatch patterns), which means that communication is not performed via those slots. Accordingly, the occupation state data in those slots is in a state in which bits corresponding to all the slots 1 to 15 are negated. It should be noted that the other occupied slots (1, 3, 4, 6, etc.) each have a bit state showing the states of all the slots 1 to 15 as far as a node performing the communication via the corresponding slot can recognize. As described above, the slots have different occupation state data pieces from one another because of different timings at which the nodes occupy the slots to perform communication or other such reason. This formation of the occupation state data is further described later. When the processing of S201 is ended, the processing proceeds to S202.

In S202, the first operation unit 12 performs the OR operation among all the occupation state data pieces of all the slots, which have been extracted in S201 and correspond to the respective slots. In the middle part of FIG. 7, the results of the OR operation are illustrated. Then, data on the results of the OR operation is referred to as provisional occupation state data. In this embodiment, in the provisional occupation state data illustrated in FIG. 7, only the slot 2 and the slot 5 are indicated by the symbol "x" (provisionally in an unoccupied state) (it should be noted that the slots 7 to 14 are not mentioned for the sake of convenience of the description). When the processing of S202 is ended, the processing proceeds to S203.

In S203, the second operation unit 13 performs the AND operation between the provisional occupation state data calculated in S202 and the release schedule data pieces of all the slots (data illustrated in the lower part of FIG. 7), which have been extracted in S201 and correspond to the respective slots. In the lower right of FIG. 7, the results of the AND operation are illustrated. Here, the provisional occupation state data is logical sums of the occupation state data pieces corresponding to the respective slots, and hence an asserted bit (state of the symbol "○") represents the state of a slot having the possibility of being occupied by a node existing in the communication system. Specifically, in the provisional occupation state data, there is a possibility that a slot in which the occupation by a node has already been canceled and which is in the unoccupied state is also indicated as the "occupied state" by the asserted bit (state of the symbol "○").

Further, in the release schedule data, the schedule to release a slot that is set by a node is represented by a negated bit (state of the symbol "x"). Specifically, in the release schedule data, the negated bit represents the state of a slot that has previously been occupied by a node but is to be released thereafter. Accordingly, in the logical products of the provisional occupation state data and the release schedule data pieces of all the slots, that is, in the operation results of S203, the actual occupied state of a slot at a current time point is indicated by the mark "○" (asserted bit), and the unoccupied state is indicated by the mark "x" (negated bit).

In view of the above, after the processing of S203 is ended, in S204, the determination unit 14 determines a slot to be occupied for communication based on the operation results of S203. Then, by referring to the above-mentioned operation results, a slot in the unoccupied state is accurately determined. As a result, the efficient utilization of frequency resources may be achieved, and also, a collision with another node may be reliably avoided.

Figure 9A:
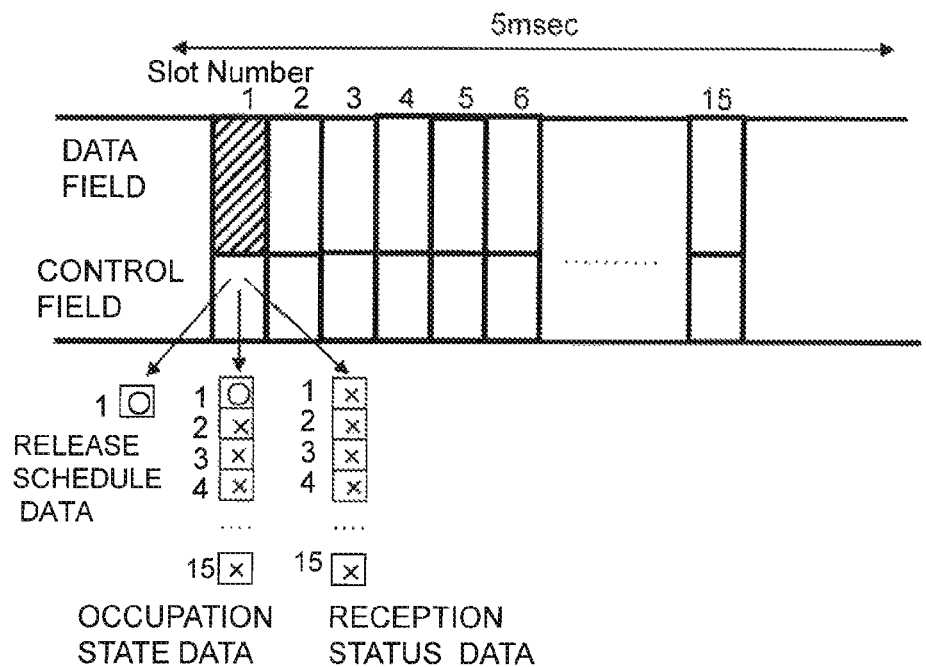
FIG. 9A is a first diagram illustrating a state of a data block in an occupation slot of an own node when the data block is broadcast from the own node in the communication system illustrated in FIG. 1.

Next, with reference to FIG. 8 and FIG. 9A, description is given of the data block generating processing executed in S108 described above. FIG. 8 is a flow chart of the data block generating processing. FIG. 9A is a diagram obtained by schematically illustrating the processing of generating, at the time of performing the data block generating processing, a data block, in particular, control data, and illustrates generation processing to be performed under a situation where communication is started in the communication system for the first time. Accordingly, in the state illustrated in FIG. 9A, before the data block generating processing is performed, all the bits of the occupation state data, the reception status data, and the release schedule data, which are stored in the control field of each slot, are negated. It should be noted that FIG. 9A illustrates the generation of the control data which is performed when the node 1 occupies the slot 1 to perform communication. First, in S301, of the occupation state data stored in the control field of the slot 1, a bit corresponding to the slot 1 is asserted (in FIG. 9A, indicated by the mark "○").

Next, in S302, based on the reception status data contained in the received data block, which has been changed in S101 described above, the reception status data on the data block to be transmitted, which is stored in the control field, is updated. In other words, the latter reception status data is made identical to the former reception status data. Because the state illustrated in FIG. 9A is the state in which communication is to be started for the first time, the reception of a data block has not been performed yet, and hence all the bits of the reception status data are still negated.

Further, in S303, based on whether or not the node 1 occupying the slot 1 is scheduled to release the occupied slot 1 in the next cycle, the release schedule data stored in the control field is updated. In FIG. 9A, because the occupation of the slot 1 by the node 1 is to be continued, the bit of the release schedule data is asserted (in FIG. 9A, indicated by the mark "○").

After the processing of generating the control data that is performed from S301 to S303, the actual data is added thereto, to thereby generate one data block (processing of S304). Here, with reference to FIG. 9A to FIG. 11B, description is given of a specific example of the above-mentioned communication control performed by the communication system configured by the five nodes A to E illustrated in FIG. 1. Those figures illustrate a specific status of the ad hoc communication in accordance with the TDMA scheme that is performed by the nodes. In particular, the status of each control data piece generated in the control field of an occupation slot contained in the transmission frame is illustrated in detail. Further, the above-mentioned communication is performed sequentially, and the status changes from the status illustrated in FIG. 9A to the status illustrated in FIG. 11B.

Figure 9B:
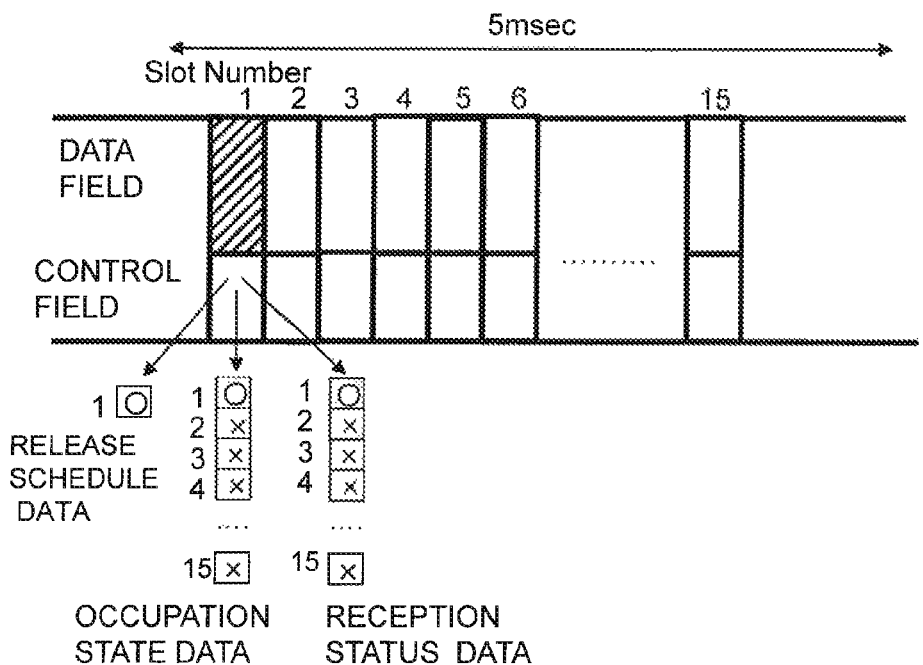
FIG. 9B is a diagram illustrating a state of the data block at another node serving as a reception node when the data block has been broadcast from the own node, corresponding to the state illustrated in FIG. 9A, in the communication system illustrated in FIG. 1.

Specifically, the status illustrated in FIG. 9A is set as the initial state of the communication system as described above, and FIG. 9A illustrates the state of control data contained in the data block of the slot occupied by the node A when the data block is broadcast from the node A, while FIG. 9B illustrates the state of control data contained in the data block at the node E, which is one reception node when the data block has been broadcast from the node A.

Figure 10A:
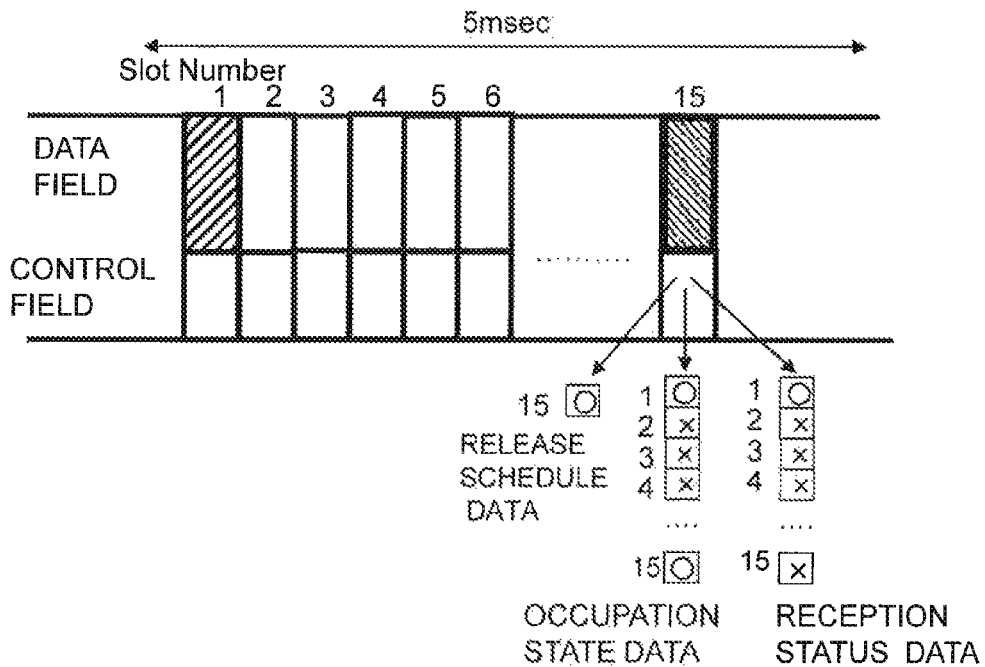
FIG. 10A is a second diagram illustrating a state of a data block in an occupation slot of the own node when the data block is broadcast from the own node in the communication system illustrated in FIG. 1.
Figure 10B:
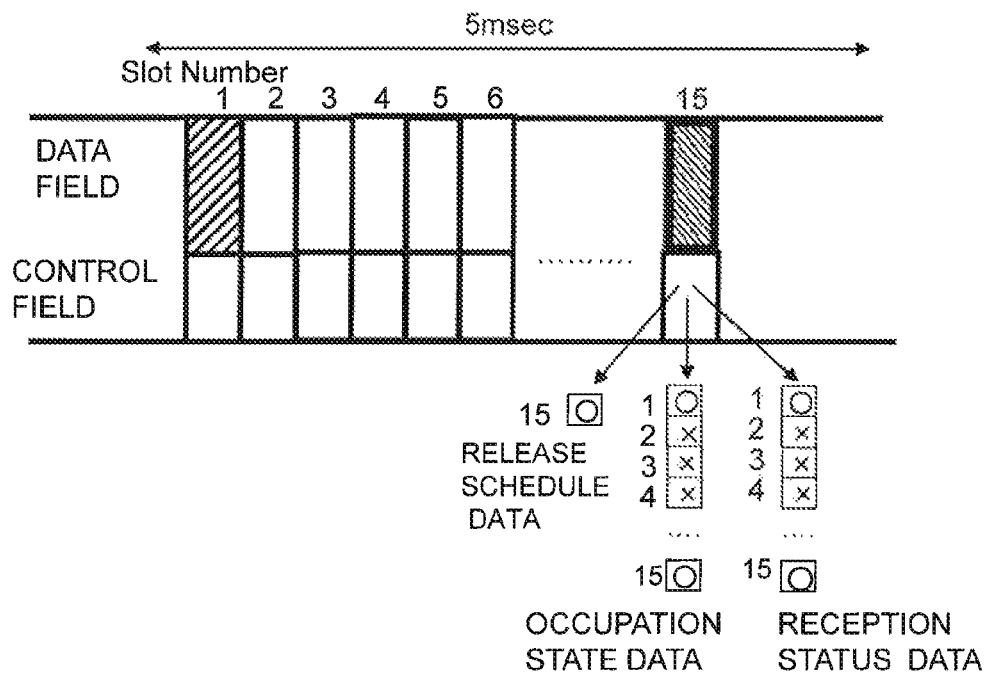
FIG. 10B is a diagram illustrating a state of the data block at another node serving as the reception node when the data block has been broadcast from the own node, corresponding to the state illustrated in FIG. 10A, in the communication system illustrated in FIG. 1.
Figure 11A:
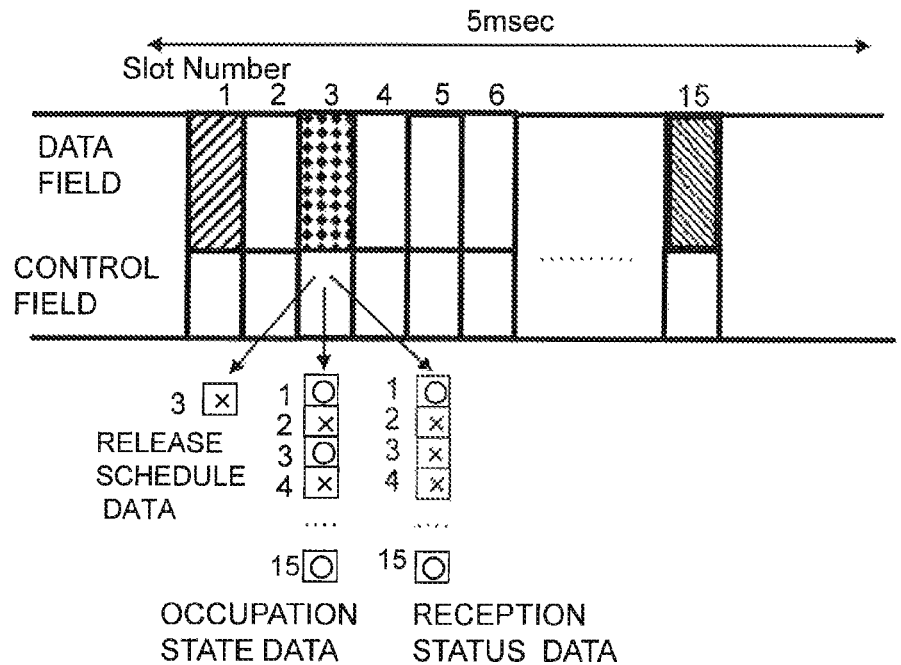
FIG. 11A is a third diagram illustrating a state of a data block in an occupation slot of the own node when the data block is broadcast from the own node in the communication system illustrated in FIG. 1.
Figure 11B:
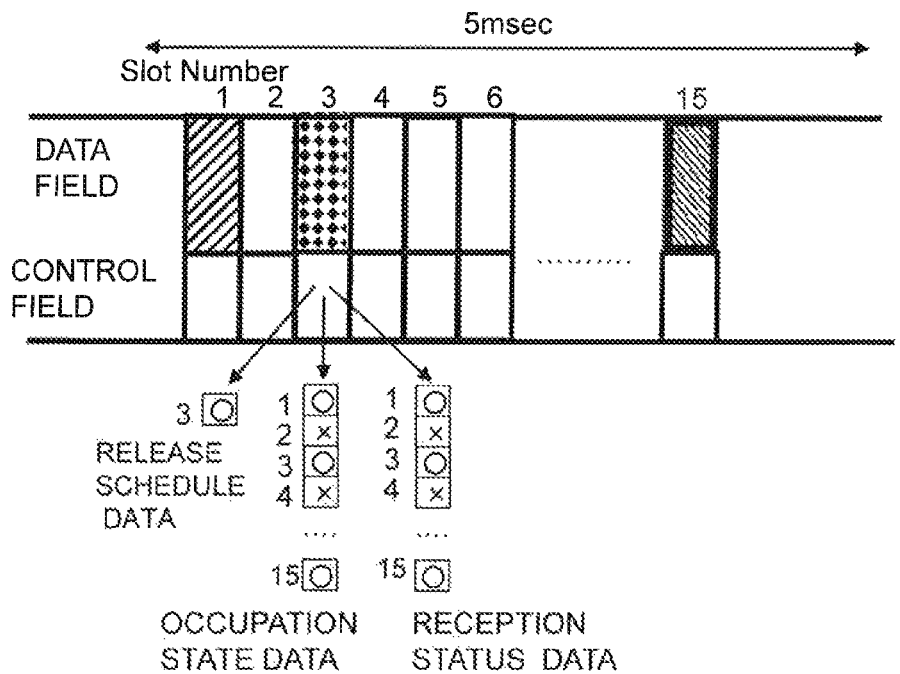
FIG. 11B is a diagram illustrating a state of the data block at another node serving as the reception node when the data block has been broadcast from the own node, corresponding to the state illustrated in FIG. 11A, in the communication system illustrated in FIG. 1.

Similarly, FIG. 10A illustrates the state of control data contained in the data block of a slot occupied by the node E when the data block is broadcast from the above-mentioned node E next, while FIG. 10B illustrates the state of control data contained in the data block at the node B, which is one reception node when the data block has been broadcast from the node E. Further, FIG. 11A illustrates the state of control data contained in the data block of a slot occupied by the node B when the data block is broadcast from the above-mentioned node B next, while FIG. 11B illustrates the state of control data contained in the data block at the node C, which is one reception node when the data block has been broadcast from the node B.

Detailed description is given of the generation of the control data when the ad hoc communication in accordance with the TDMA scheme is performed sequentially among the nodes as described above. First, in FIG. 9A, because of the initial state, all the slots are in the unoccupied state, which means that none of the slots is occupied by any node. Further, all the bits of the control data (occupation state data, reception status data, and release schedule data) contained in the control field of each slot are in the state of being negated. Here, the node A occupies the slot 1 to perform the above-mentioned communication. For this purpose, the node A generates the control data for the control field of the slot 1. Specifically, the node A asserts, of the occupation state data of the slot 1, the bit corresponding to the slot 1, and also asserts the bit of the release schedule data of the slot 1 so as to continue the above-mentioned communication via the slot 1. It should be noted that the actual data for the slot 1 is stored in the data field, and as a result, a data block to be transmitted by the node A is formed.

Next, with reference to FIG. 9B, description is given of processing for the control data that is performed by the node E that has received the data block transmitted from the node A. In the node E, the reception of the data block is performed via the slot 1 occupied by the node A. At this time, based on a reception status result of the data block at the node E, for example, based on whether the result indicates the CRC normality or the CRC abnormality, the bit of the reception status data that corresponds to the slot 1 is asserted or negated. In the state illustrated in FIG. 9B, the data block is received normally by the node E, and hence the bit corresponding to the slot 1 is asserted.

Further, in this embodiment, with reference to FIG. 10A and FIG. 10B, description is given of processing performed when communication is started by the node E that has received the above-mentioned data block. As illustrated in FIG. 10A, in order for the node E to start communication, a slot to be occupied needs to be determined in the transmission frame. In accordance with the above-mentioned occupation slot determining processing, the node E determines which slot the own node is to occupy. As a result, due to the fact that the slots that are not occupied by the other nodes in the transmission frame are the slots 2 to 15, the slot 15 is set as the occupation slot of the node E in this embodiment. Then, when the occupation slot is determined, the node E starts to generate a data block to be transmitted.

In generating the control data to be contained in the data block of the node E, in a communication frame of a cycle immediately before a cycle of the communication frame illustrated in FIG. 10A, the control data regarding the node E is overwritten based on the control data contained in the data block transmitted from another node. In other words, the control data is accumulated among a plurality of nodes. Accordingly, in this embodiment, based on the control data received in the latest transmission frame from the node A via the slot 1, the control data to be contained in the data block of the node E is generated. Specifically, a bit of the occupation state data that corresponds to the slot 15, which is to be occupied by the node E, is asserted. Further, with regard to the release schedule data, based on the release schedule of the slot 15 to be occupied by the node E, a bit indicating the release schedule of the slot 15 is asserted or negated (thus, the control data to be transmitted via the slot 15 does not contain the release schedule data regarding the other slots). Further, with regard to the reception status data, the data subjected to the change processing at the time of reception as illustrated in FIG. 9B is used without any change. After the control data is generated as described above, the actual data that the node E desires to transmit is added, and then, the resultant data is transmitted as one data block to the other nodes.

Then, with reference to FIG. 10B, description is given of processing for the control data that is performed by the node B that has received the data block transmitted from the node E. In the node B, the reception of the data block is performed via the slot 15 occupied by the node E. At this time, based on a reception status result of the data block at the node B, the bit of the reception status data that corresponds to the slot 15 is asserted or negated. In the state illustrated in FIG. 10B, the data block is received normally by the node B, and hence the bit corresponding to the slot 15 is asserted.

Next, in this embodiment, with reference to FIG. 11A and FIG. 11B, description is given of processing performed when communication is started by the node B that has received the above-mentioned data block. As illustrated in FIG. 11A, in order for the node B to start communication, a slot to be occupied needs to be determined in the transmission frame. In accordance with the above-mentioned occupation slot determining processing, the node B determines which slot the own node is to occupy. As a result, due to the fact that the slots that are not occupied by the other nodes in the transmission frame are the slots 2 to 14, the slot 3 is set as the occupation slot of the node B in this embodiment. Then, when the occupation slot is determined, the node B starts to generate a data block to be transmitted.

In generating the control data to be contained in the data block of the node B, in a communication frame of a cycle immediately before a cycle of the communication frame illustrated in FIG. 11A, the control data regarding the node B is overwritten based on the control data contained in the data block transmitted from another node. In this embodiment, based on the control data received in the latest transmission frame from the node E via the slot 15, the control data to be contained in the data block of the node B is generated. Specifically, a bit of the occupation state data that corresponds to the slot 3, which is to be occupied by the node B, is asserted. Further, with regard to the release schedule data, based on the release schedule of the slot 3 to be occupied by the node B, a bit indicating the release schedule of the slot 3 is asserted or negated (thus, the control data to be transmitted via the slot 3 does not contain the release schedule data regarding the other slots). It should be noted that, in this embodiment, it is assumed that the occupation of the slot 3 by the node B is limited to one transmission frame, and hence there is no need to occupy the slot 3 in the next transmission frame. Accordingly, the release schedule bit of the slot 3 is negated. Further, with regard to the reception status data, the data subjected to the change processing at the time of reception as illustrated in FIG. 10B is used without any change. After the control data is generated as described above, the actual data that the node B desires to transmit is added, and then, the resultant data is transmitted as one data block to the other nodes.

Then, with reference to FIG. 11B, description is given of processing for the control data that is performed by the node C that has received the data block transmitted from the node B. In the node C, the reception of the data block is performed via the slot 3 occupied by the node B. At this time, based on a reception status result of the data block at the node C, the bit of the reception status data that corresponds to the slot 3 is asserted or negated. In the state illustrated in FIG. 11B, the data block is received normally by the node C, and hence the bit corresponding to the slot 3 is asserted.

In this manner, when the ad hoc communication in accordance with the TDMA scheme is performed by the nodes, the slot to be occupied is determined in accordance with the control data of each slot of the transmission frame. As a result, the occupation slot may be determined without a collision in the above-mentioned ad hoc communication, which therefore serves for the effective utilization of frequency resources.

Figure 12:
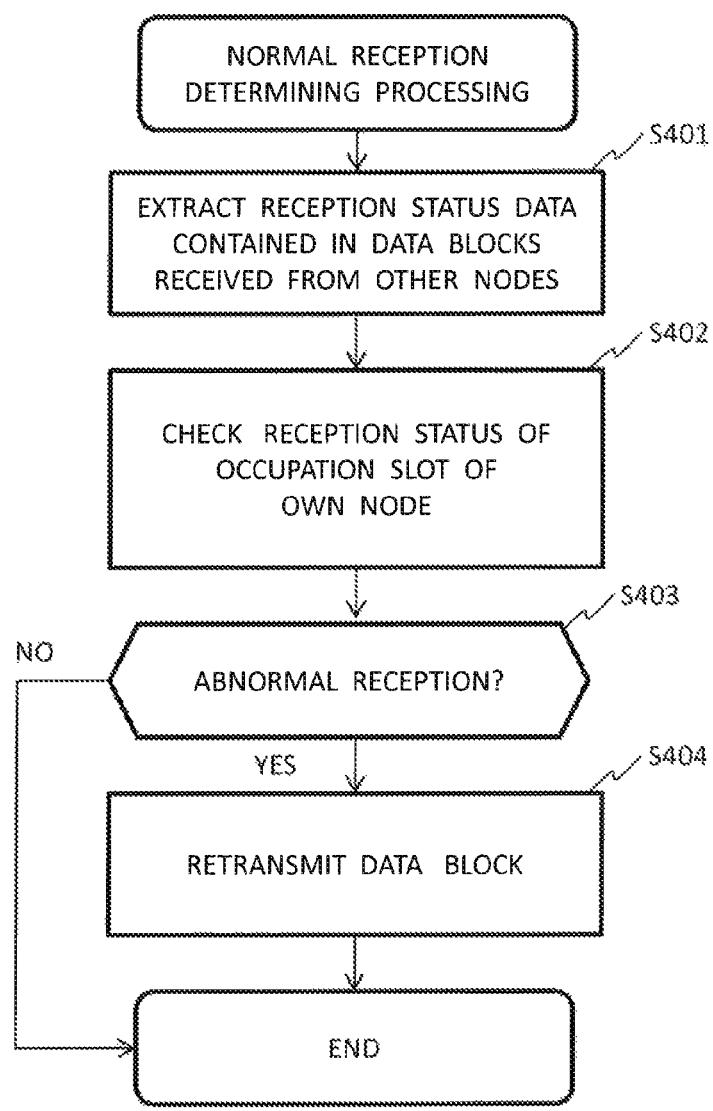
FIG. 12 is a flow chart of normal reception determining processing that is executed in the communication node according to the embodiment of the present invention.

Further, due to the fact that the control data is processed as described above between the nodes that perform the transmission and reception, when the own node receives the data block from another node, it is possible to determine whether or not the data block transmitted from the own node in the past has been received normally by the another node. Hereinafter, with reference to FIG. 12, description is given of control regarding the determination as to whether or not normal reception has been achieved. It should be noted that the normal reception determining processing illustrated in FIG. 12 is executed mainly by the data receiving unit 10 and the normal reception determining unit 15 illustrated in FIG. 4.

In S401, from the data blocks corresponding to the respective slots that are stored in the storage device 6 through the processing of S101, in other words, from the data blocks for one frame that the own node receives from another node immediately before performing the processing for the occupation slot, the reception status data is extracted. When the processing of S401 is ended, the processing proceeds to S402.

In S402, based on extraction results obtained in S401, the reception status of the data block that the own node transmitted to the another node in the past via the slot occupied by the own node may be checked. As described above, with regard to the reception status data, in the node that has performed the reception, the processing of changing the bit in accordance with the reception status is performed. Thus, if the own node side that transmitted the data block in the past checks the change result of the reception status, it is possible to determine whether or not the data block has been received normally by the another node.

For example, to give description using the above-mentioned example, in the state illustrated in FIG. 9B, the node E receives the data block from the node A normally, and as a result, the bit of the reception status data that corresponds to the slot 1 is asserted. Then, in a case where the node E transmits the data block to another node, the control data illustrated in FIG. 10A is generated. Here, in FIG. 10B, the reception status at the node B is illustrated, but in the communication system illustrated in FIG. 1, the data block is transmitted through broadcasting, and hence the data block containing the control data illustrated in FIG. 10A is also transmitted from the node E to the node A in a similar manner. At that time, the node A may make a determination as to whether or not the data block transmitted by the own node in the past has been received by the node E normally, based on the reception status data contained in the data block transmitted from the node E. Accordingly, in the case of this embodiment, it is confirmed that the node E has received the data block normally. It should be noted that, with regard to the reception statuses at the other nodes than the node E, the node A, which is the own node, may make determinations as appropriate when the data blocks are received from those nodes.

Then, in S403, based on a result of the check of S402, it is determined whether or not the data block transmitted by the own node has resulted in the abnormal reception. When the determination is "Yes", the data block (the data block that has resulted in the abnormal reception and the actual data portion are in the same data block) is retransmitted from the own node in S404. In this retransmission as well, it is desired that the above-mentioned occupation slot determining processing and the like be performed so as to prevent a collision with another node from occurring. It should be noted that, in a case where the determination is "No" in the determination of S403, or after the processing of S404 is ended, this normal reception determining processing is ended. Owing to the normal reception determining processing, communication of the data blocks among the nodes constituting the communication system may be performed more reliably.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A communication node that performs ad hoc communication in accordance with a time division multiple access scheme by occupying at least one time slot in one frame formed of a plurality of time slots and transmitting a data block to one or a plurality of other nodes via the occupied at least one time slot through broadcasting, the communication node comprising:
    a determination unit that determines, from among the plurality of time slots, an occupation time slot to be occupied by an own node in a transmission target frame used for transmitting the data block, based on occupation state data indicating an occupied/unoccupied state of each of the plurality of time slots, which the own node possesses at a time point before the transmission target frame;
    a data block generating unit that generates the data block storing, in a control field, control data containing new occupation state data obtained by updating the occupation state data based on an occupation state of the occupation time slot determined by the determination unit, the data block being to be transmitted by the own node through the broadcasting; and
    a transmission unit that transmits the data block generated by the data block generating unit through the broadcasting via the occupation time slot determined by the determination unit.

2. The communication node according to claim 1, further comprising a reception unit that receives, via a time slot occupied by another node, a data block transmitted from the another node through the broadcasting, the data block including the control field storing the control data containing the occupation state data indicating the occupied/unoccupied state of the each of the plurality of time slots,
    wherein the determination unit determines, from among the plurality of time slots, the occupation time slot based on the occupation state data contained in the data block received, in a frame immediately before the transmission target frame, by the reception unit.

3. The communication node according to claim 2, wherein:
    the data block generating unit further adds, to the control data, slot release schedule data indicating whether or not the occupation time slot occupied by the own node for the transmission unit to transmit the data block is to be released in a next frame, and stores the control data in the control field, to thereby generate the data block; and
    after the transmission unit transmits the data block generated by the data block generating unit, the occupation state of the occupation time slot is adjusted in accordance with the slot release schedule data.

4. The communication node according to claim 3, further comprising:
    a storage unit that stores the occupation state data and the slot release schedule data that are contained in the data block received by the reception unit via the each of the plurality of time slots of the one frame;
    a first operation unit that applies, after the occupation state data and the slot release schedule data are stored in the storage unit, an OR operation to the stored occupation state data corresponding to the each of the plurality of time slots of the one frame, to thereby generate provisional occupation state data on the plurality of time slots of the one frame; and
    a second operation unit that performs an AND operation between the provisional occupation state data generated by the first operation unit and the slot release schedule data corresponding to the each of the plurality of time slots of the one frame, which is stored in the storage unit, to thereby calculate onset slot occupation state data indicating occupation states of the plurality of time slots of the next frame that comes after the one frame,
    wherein the determination unit determines the occupation time slot based on the onset slot occupation state data calculated by the second operation unit.

5. The communication node according to claim 2, wherein:
    the control data further contains reception status data indicating whether or not the data block transmitted through the broadcasting via the each of the plurality of time slots of the one frame has been received normally by the reception unit; and
    the data block generating unit obtains, based on a reception status of the data block received from the another node by the reception unit, new reception status data by updating the reception status data contained in the data block received from the another node by the reception unit, to thereby generate a data block in which control data containing the new reception status data is stored in the control field.

6. The communication node according to claim 5, further comprising a normal reception determining unit that determines, based on the reception status data contained in the data block received from the another node by the reception unit, whether or not the data block previously transmitted, through the broadcasting, from the own node by using the transmission unit has been received by the another node normally.

7. An ad hoc communication method in accordance with a time division multiple access scheme, in which at least one time slot in one frame formed of a plurality of time slots is occupied, and a data block is transmitted to one or a plurality of other nodes via the occupied at least one time slot through broadcasting, the method comprising:
    determining, from among the plurality of time slots, an occupation time slot to be occupied by an own node in a transmission target frame used for transmitting the data block, based on occupation state data indicating an occupied/unoccupied state of each of the plurality of time slots, which the own node possesses at a time point before the transmission target frame;
    generating the data block storing, in a control field, control data containing new occupation state data obtained by updating the occupation state data based on an occupation state of the occupation time slot determined in the determining, the data block being to be transmitted by the own node through the broadcasting; and
    transmitting the data block generated in the generating through the broadcasting via the occupation time slot determined in the determining.

8. The ad hoc communication method in accordance with a time division multiple access scheme according to claim 7, further comprising receiving, via a time slot occupied by another node, a data block transmitted from the another node through the broadcasting, the data block including the control field storing the control data containing the occupation state data indicating the occupied/unoccupied state of the each of the plurality of time slots, wherein the determining comprises determining, from among the plurality of time slots, the occupation time slot based on the occupation state data contained in the data block received in a frame immediately before the transmission target frame in the receiving.

9. A communication system comprising:

a plurality of nodes, each of which performs ad hoc communication in accordance with a time division multiple access scheme by occupying at least one time slot in one frame formed of a plurality of time slots and transmitting a data block to one or a plurality of other nodes via the occupied at least one time slot through broadcasting, each of the plurality of nodes including a control device to execute processings including:

receiving a data block transmitted through the broadcasting via a time slot occupied by another node, the data block being a data block to be broadcast by each of the plurality of nodes, which stores, in a control field, control data containing occupation state data indicating an occupied/unoccupied state of each of the plurality of time slots;

determining, as an occupation time slot, a time slot that is in an unoccupied state in the one frame based on the occupation state data contained in the received data block;

updating the occupation state data contained in the received data block based on an occupation state of the occupation time slot;

storing, in the control field of the data block, control data containing, as new occupation state data, the updated occupation state data; and transmitting the data block through the broadcasting via the determined occupation time slot.

\* \* \* \* \*